July 11, 1961 S. INNOCENTI 2,991,879
SEALED-PACKAGE WRAPPER END TESTER
Filed Aug. 30, 1957 7 Sheets-Sheet 1

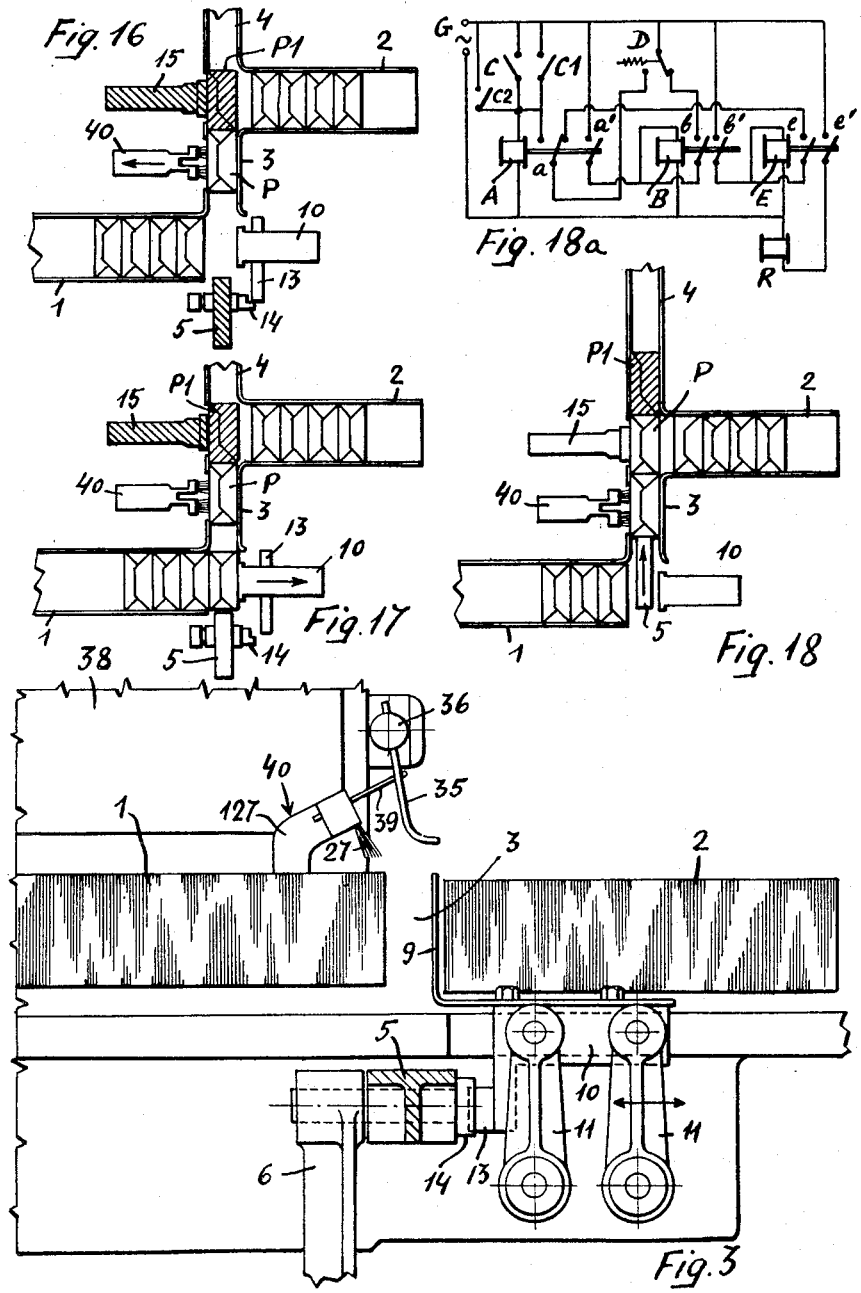

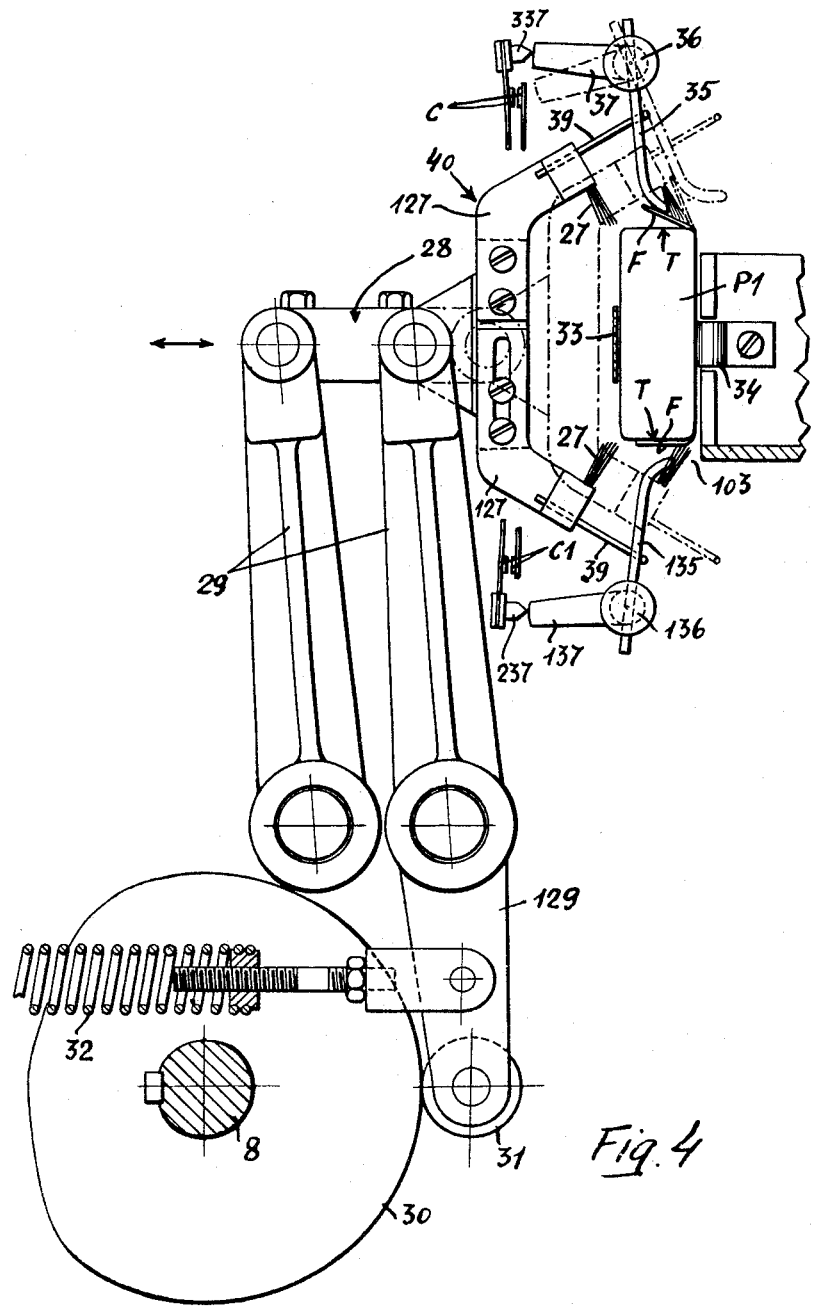

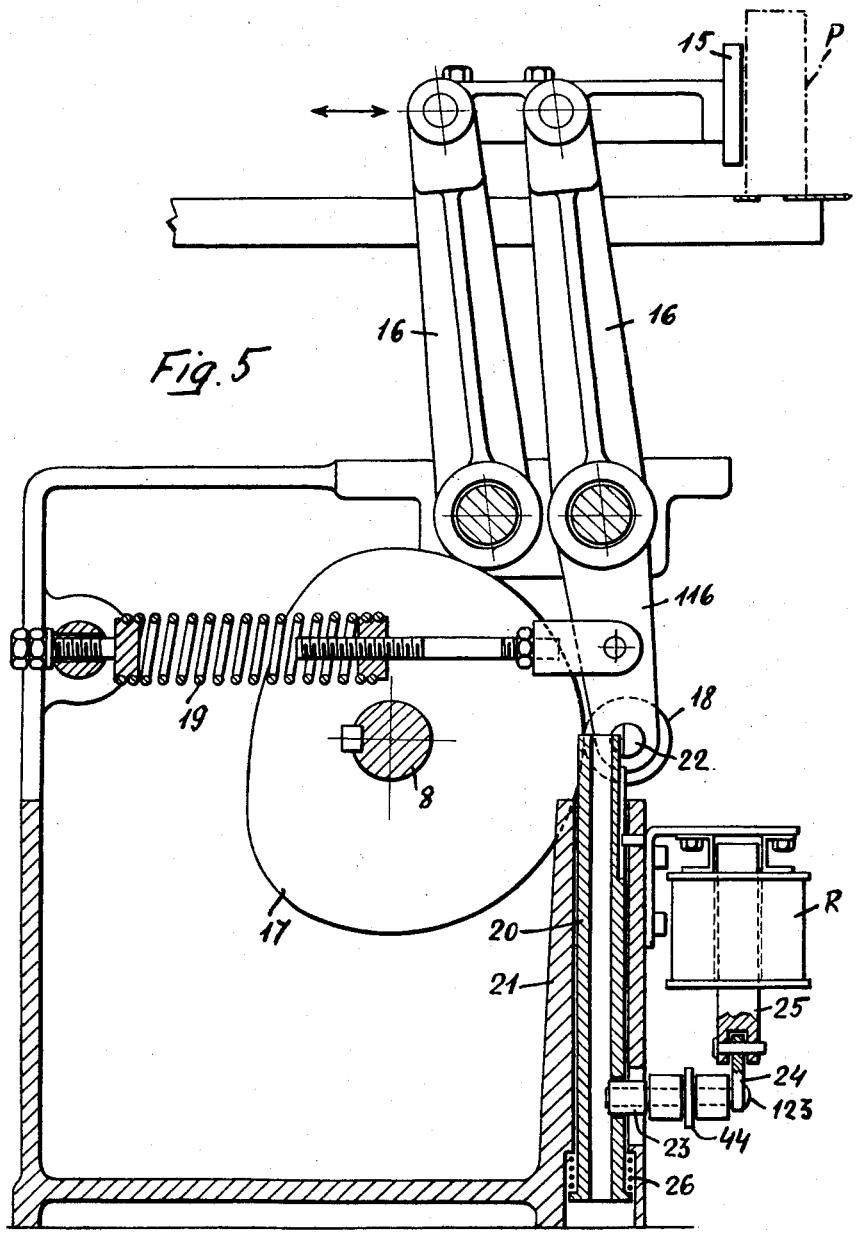

July 11, 1961

S. INNOCENTI 2,991,879

SEALED-PACKAGE WRAPPER END TESTER

Filed Aug. 30, 1957

July 11, 1961  S. INNOCENTI  2,991,879
SEALED-PACKAGE WRAPPER END TESTER
Filed Aug. 30, 1957  7 Sheets-Sheet 7
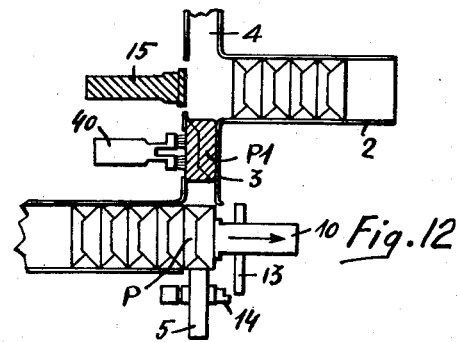
Fig. 12
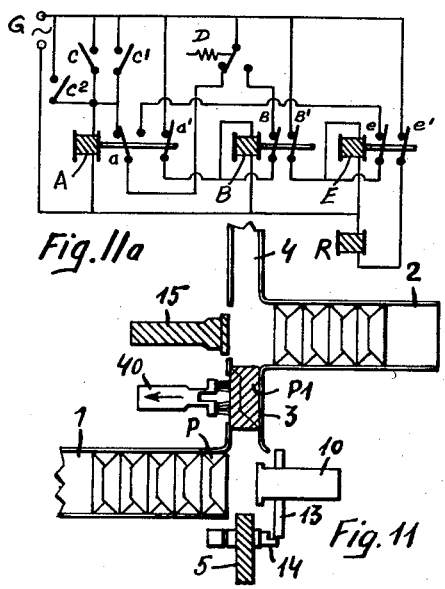
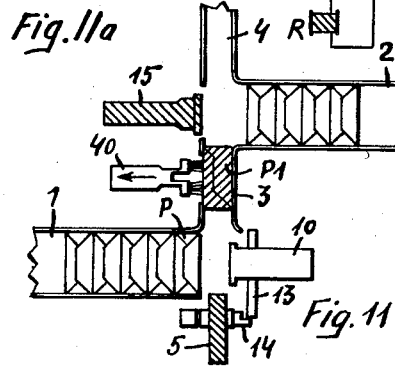
Fig. 11a
Fig. 11
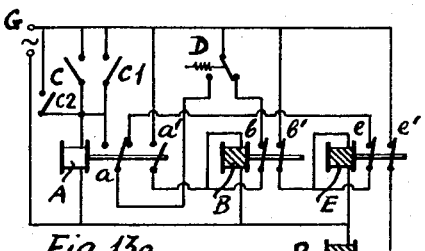
Fig. 13a
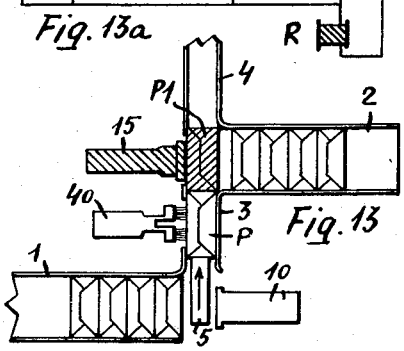
Fig. 13
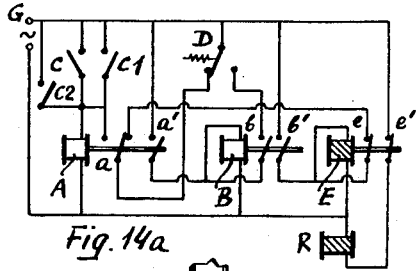
Fig. 14a
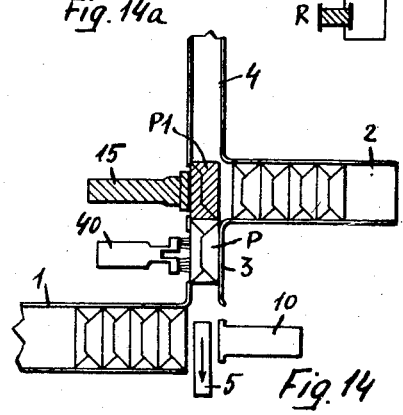
Fig. 14
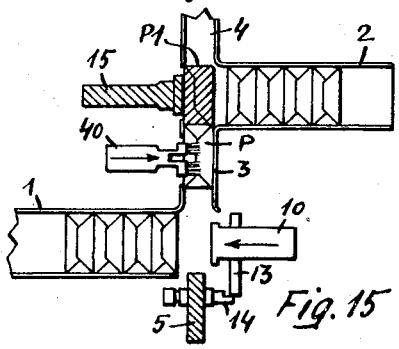
Fig. 15

United States Patent Office 2,991,879
Patented July 11, 1961

2,991,879
SEALED-PACKAGE WRAPPER END TESTER
Scipione Innocenti, Bologna, Italy, assignor to S.A.S.I.B.
S.p.A. Scipione Innocenti Bologna, Bologna, Italy, an
Italian joint-stock company
Filed Aug. 30, 1957, Ser. No. 681,266
Claims priority, application Italy May 22, 1957
13 Claims. (Cl. 209—72)

This invention relates to a sealed-package wrapper end tester and aims to provide a device for automatically testing the sealing of the ends of package wrappers having tucked end flaps, such as conventional cigarette packages or "packets" delivered from a cigarette-packing machine.

The main object of the invention is to provide a device permitting of testing the sealing of the ends of cigarette packages—which will be briefly referred to as "packets" coming from a cigarette-packing machine and raising a flap from the imperfectly sealed package end or ends.

Another object of the invention is to provide means for automatically discarding all packages whose end or ends are imperfectly sealed.

Still another object of the invention is to provide a completely automatic wrapper-testing and defective package discarding machine which may be inserted between a packing machine, and for example a cigarette-packing machine and an automatic parcel-forming and wrapping machine, which forms standard parcels out of a predetermined number of perfectly sealed packages coming from said packing machine, whereby the operation of said parcel-forming machine needs not to be perfectly timed with the operation of said packing machine.

The need for such a package-end tester and defective package-discarding device is apparent when considering that this machine discards a number of packages coming from the packing machine, so that the number of packages delivered to a subsequent machine, such as a cellophane-wrapping or a parcel-forming machine may be smaller than the number of packages delivered by the packing machine, so that the said subsequent machines cannot be exactly timed with said packing machine.

The above and other ends and advantages of the invention will be apparent from the following specification of a preferred embodiment of a machine which is particularly adapted for testing the sealing of the ends of conventional cigarette packages or "packets" and for automatically discarding the defective packages whereas the perfectly sealed packages may be led to a delivery channel or the like, adapted to be connected to the feed of subsequent machine, such as a cellophane-wrapping or a parcel-forming machine.

The said embodiment of the invention is shown by way of non-limiting example in the attached drawings in which:

FIG. 1a is a perspective view of a conventional cigarette package or "packet," as delivered by a packing machine.

FIGURES 3, 4 and 5 are vertical cross sections on lines III—III, IV—IV and V—V of FIGURE 1.

FIGURES 6 to 18 show the mechanical parts of the tester in different working positions and FIGURES 6a, 10a, 11a, 13a, 14a and 18a are the wiring diagrams showing the operating positions of the different switches and relays of the correspondingly numbered figures.

Figure 1:
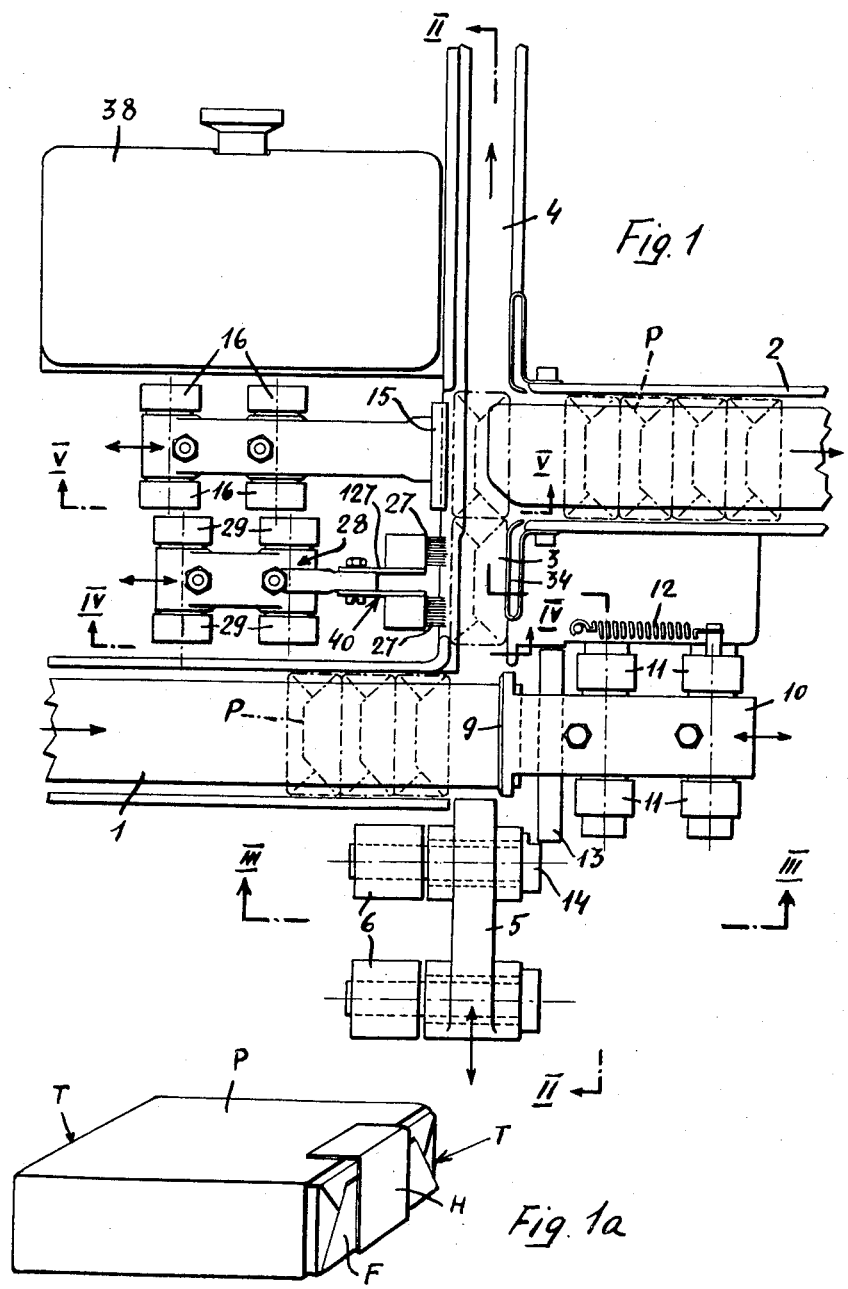
FIG. 1 is a plan view of the principal mechanical parts of the tester.

With reference to the drawings, as said in the preamble of the specification, the embodiment of the tester to be described is particularly adapted for testing the sealing of the ends of packages, such as a conventional cigarette package or packets P shown in FIGURE 1a, the ends of which are indicated by the reference letter T and comprise tucked end flaps F, the sealing of which is effected by gluing said flaps together and/or sticking or otherwise attaching thereon a sealing strip H.

The device according to the invention, which will be briefly called the tester, comprises a pair of parallel channels 1 and 2 which are preferably spaced by a distance substantially corresponding to the width of one packet.

The outlet end of channel 1, which is the packet feed channel communicates with the inlet end of channel 2, which is the sealed packets delivery channel, by means of a short transverse channel section, which will be called the testing channel 3. This channel is provided on the side of the channel 2 with an extension or discarding channel 4. The channel 1 is provided with conventional means for feeding the packages P, usually coming from a packing machine, towards the said transverse testing channel 3. At the confluence of channels 1 and 3 a side opening is provided in front of which a feed plunger 5 is arranged which is reciprocated by suitable means across the end of said channel 1 and into said channel 2 so as to divert each packet P which has been just expelled out of said channel 1 and has reached what will be called the "inlet station" into said testing channel 3 at right angles thereto in a position which will be called the "testing station." On the other hand the packet which has been shifted from the feed channel 1 to the testing channel 3 shifts further in the same measure the packet at the testing station towards the "outlet station" which is in front of the inlet end of the delivery channel 2 and near the inlet of the discarding channel 4. The packets in this station may be either pushed into channel 2, when their ends are perfectly sealed, or into the discarding channel 4, if it is not perfectly sealed. In the first case they are pushed into channel 2 by a reciprocating member or piston 15 acting through an opening provided between one side of the channel 3 and the channel 4.

When however a testing device now to be described detects at the said testing station a package having not perfectly sealed ends, means enter into action which temporarily lock said reciprocating member or piston 15 when said package reaches said outlet station where said package is pushed by the package which is being shifted from the testing to the outlet station.

Having thus briefly outlined the scheme of operation of the tester an embodiment of the devices adapted to perform the above outlined functions will be now described.

The said feed plunger 5 is carried by a pair of parallel rocking arms 6 (FIGURES 1 and 2) hinged at one end to the machine frame and at the other end to a part integral with said plunger 5. One of the arms is provided with a cam-follower roller 106 conventional spring means (not shown) being provided for pushing said roller 106 against a front cam 7 fastened to a shaft 8 which is driven in synchronism with the packing machine.

The end of the inlet channel 1 may be closed by a plate 9 forming the end of a gate 10 carried by a pair of rocking arms 11 which are urged towards the inlet channel 1 by a spring 12. An elongated abutment or abutment bar 13 fastened to gate 10 co-acts with an abutment 14 carried by plunger 5 so as to stop the operation of said plunger 5 whenever it comes into the path of said abutment 14.

The operation of the above described device may be summarized as follows: when the plate 9 of the gate 10 is pushed by spring 12 against the outlet end of channel 1, the abutment 13 comes into the path of the abutment 14 and the plunger 5 is stopped (see particularly FIGURES 2, 3, 6, 10, 11, 15). When however a package P is pushed by feed means with sufficient force against the plate 9 of gate 10, this is pushed into its "inlet station" (FIGURES 7, 12 and 17) and the abutment bar 13 comes out of the path of the abutment 14, so that the plunger 5 is reciprocated by the revolving cam 7 and transfers the package in front of it into the testing channel 3, at the testing station.

During such reciprocation the abutment 14 slides along the abutment bar 13, and thus keeps the gate 10 in its outward position (FIGURES 8, 9, 13, 14 and 18).

As it is apparent from the drawings, the packets are pushed into the testing channel 3 upright, by their smaller sides, the larger sides bearing against the side walls 33, 34 of said channel 3, at least one of which (in the example as shown, wall 34), is a spring plate. In order however to permit the testing of both ends of said package, the top of the channel 3 is opened and its bottom shows in correspondence of the said testing station a suitably large opening 103, so as to have free access to the bottom end of the packages at said testing station.

On one side of said channel 3 the testing device proper is arranged, which will now be particularly described.

Figure 2:
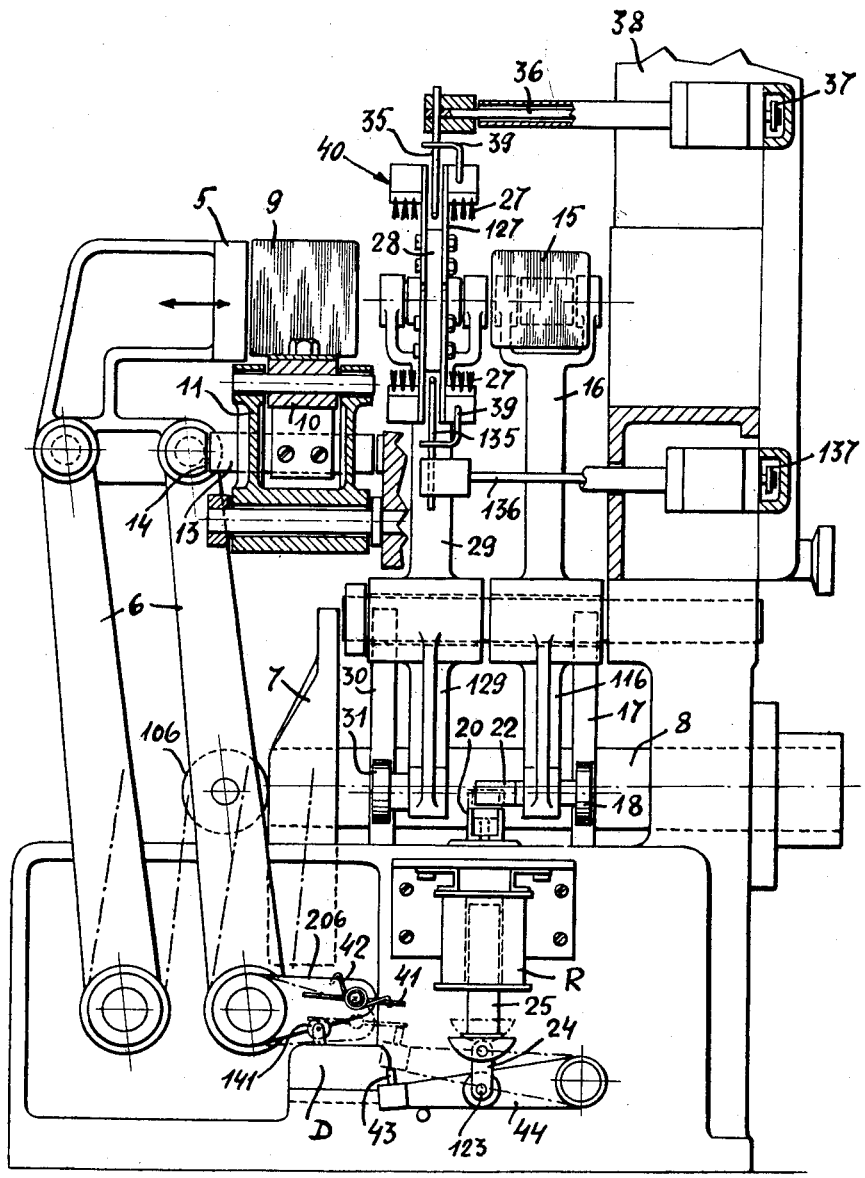
FIG. 2 is a longitudinal vertical section on line II—II of FIGURE 1.

With particular reference to FIGURES 1, 2 and 4 the said testing device, indicated by the numeral 40, comprises a pair of elbow-shaped members 127 which are fastened (at least one of them in adjustable manner) to a supporting member 28. At the free ends of said elbow member 127 a pair of spaced brushes 27 is fitted whose bristles are so arranged as to be able to brush against the edge of a sealed flap at each end of any package which comes to be at the testing station in the channel 3. Each of supporting members 127 carries also a hook 39 for the purpose which will be seen hereinafter. The supporting member 28 is mounted on a rocking device comprising a pair of parallel arms 29 which are rocked transversally of the channel 3 and form an articulated parallelogram which is driven by a cam 30 keyed to a shaft 8. One of these rocking arms 29 is provided with an extension 129 which is provided with a cam follower roller 31 which is maintained in contact with a cam 30 by a spring 32 anchored to the extension 129.

The bristles are reciprocated in synchronism with the arrival of each package P at the testing station and whenever a flap F of either or both package ends T is not well sealed, the brushes 27 slip under it and lift same as shown by dotted lines at the top end of the package P1 in FIGURE 4.

In proximity to each of the brushes 27 feeler fingers 35 and 135 are arranged (FIGURES 2, 3 and 4). Each of the said fingers is secured to a rocking shaft 36—136 carrying also a cam 37—137 each coacting with a pusher 237—337 integral with a spring carrying one of a pair of co-acting electrical contacts C and C1, respectively. These contacts are enclosed in the casing 38 and form a part of the electric control circuit of the tester, to be described hereinafter. The adjustable hook members 39 arranged in proximity of each brush 27 are so shaped as to be able to hook the feeler fingers 35 and 135. The operation of this device is as follows:

Normally, when the brushes 27 come to be outside of the testing channel 3, the fingers 35 and 135 are held by the hook members 39 with their ends close by the corresponding end T of the package P at the testing station, whilst the cams 37 and 137 hold the contacts C, C1 open (full line position in FIGURE 4). If upon advancing of the brushes 27 transversally of the testing channel 3 one of them raises the top flap F of a defective package P1, the corresponding feeler finger 35 which are (is) no longer hooked by the hook 39 is rocked by the raised flap F thus rocking the cam 37 out of contact of member 337 and permitting the closure of contact C. When however the corresponding package end (see lower end in FIGURE 4) is perfectly sealed, the corresponding feeler finger 135 is not rocked and the corresponding cam 137 keeps the contacts C1 open. Upon the return movement of the brushes 27 their hook members pull back to or hold the feeler fingers 35, 135 in their rest positions, in which the contacts C, C1 are opened. The closure of any of the contacts C, C1 is employed in any suitable manner for arresting the operation of the delivery piston 15 for a sufficient time to prevent imperfectly sealed package P1 from being pushed into the delivery channel 2 and for permitting same to be pushed into the discarding channel 4 by the next-tested package, which is pushed by plunger 5 beyond the testing station, at the outlet station.

The delivery piston 15, which is arranged in front of the inlet of the delivery channel 2 is mounted on a pair of parallel rocking arms 16 one of which is provided with an extension 116 carrying a cam follower roller 18 urged by a spring 19 against a cam 17 mounted on shaft 8. The rocking of the piston 15 by the cam 17 may be prevented when any of the contacts C or C1 is closed by the following device (FIGURES 2 and 5).

The extension 116 of a piston-actuating lever 16 is provided with an abutment member 22, which, in the case as shown is an extension of the pivot pin of cam roller 18. Under this abutment 22 a tubular member 21 is fitted in which a tubular rod 20 is slidably mounted. This rod is normally maintained in its lower or rest position, out of the path of abutment 22, by suitable means as spring 26 and may be brought in extended or operating position (FIG. 5) when it is pulled against the action of spring 26 by suitable means such as an electromagnet R provided with a suitable core 25 connected by a link 24 to a pin 123 carrying a roller 23 engaging said rod 20 through a slot of tubular member 21.

The cam 17 is so shaped as to pull the piston 15 out of contact with any package P while the pushing of the piston 15 against the package P is effected by spring 19. When however the rod 20 is in its outward position (FIG. 5) it comes into the path of abutment 22 and thus keeps the piston 15 out of contact with the package, against the action of spring 19. This happens each time the electromagnet R is energized, due to the closure of any of said contacts C or C1, and centers its core 25 within the inductive coil of the electromagnet R which lifts said rod 20.

Figure 6A:
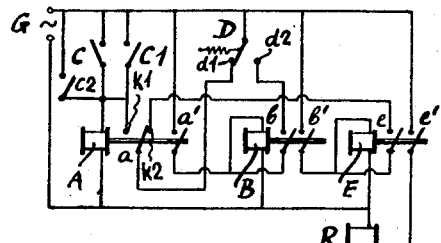

The said contacts C–C1 in parallel and the locking relay R for the piston 15, form part of an electric control circuit which is shown in rest position in FIGURE 6a and comprises further a push switch D and three other relays A, B and E. Switch D is controlled by the mechanical device to be described hereinafter and may co-act with either of two contacts $d1$ and $d2$. Relay A carries a pair of parallel switches $a$ and $a'$, the first of which is a change-over switch and may co-act with either of two contacts $k1$ and $k2$. This relay A may be connected to the power source through either or both of the contacts C and C' and, when energized, it attracts the switches $a$ and $a'$ and switches $a$ towards the contact $k1$ and closes the switch $a'$. The circuit is so arranged that when push-switch D is switched towards the contact $d1$ (rest or $d1$-position) relay A may remain energized through a shunt circuit including push switch D and switch $a$ on contact $k1$ connected to the circuit including the contacts C–C1. The second relay B may be connected to the power source through the switch $a'$ of the first relay A and, when energized, also through a shunt circuit including its own switch $b$ and push-switch D in position $d2$. The circuit of the third relay E may be closed through the switch $b'$ of the second relay B and, when energized also through a shunt circuit including its own switch $e$, the switch $a$ in $k2$-position and the push-switch D in $d2$-position. Eventually the locking electromagnet R is energized also through a circuit including the switch $e'$ of the third relay E, when this relay is energized.

Let us now describe control means for the push switch D: This switch D is normally kept in rest or $d1$-position by spring means, but may be switched to "operating position" against contact $d2$ by the means now to be described with reference to FIGURE 2.

One of the arms 6 carrying the feed plunger 5 is provided near its hinged end remote from the said plunger with a crank arm 206. Near the free end of said crank arm a small balance lever 41 is fulcrumed, which is maintained in rest position by a spring 42. Under the inside arm of said lever 41 is arranged a spring-pressed control push member 141 of said switch D, so that said push member 141 may be depressed by said arm against the force of its spring, thus switching the movable contact member of said switch D towards the contact $d2$ in FIG. 6.

In proximity to the above-described parts, the electromagnet R is fitted which is provided with magetic armature core 25 which is connected through link 24 with a point between the ends of a lever 44 fulcrumed by one end to a fixed part of the machine and carrying at its opposite end an abutment 43 which is so arranged as to be able to come into the path of the outer arm of balance lever 41, when it is shifted upwardly by the energized magnet R and, at the same time, the crank 206 is rocked downwardly (dotted line position in FIG. 2).

The operation of the above-described device is as follows: The lever 41 is rocked together with the arms 6, when the feed plunger 5 is operated, but it does not push said push member 141 when it is in rest position, viz. until the relay R is de-energized. When however this relay is energized, it lifts the abutment 43 so that when the crank 206 is rocked downwardly said abutment rocks the balance lever 41 in such a manner as to depress by means of its inner arm the said push member 141 of switch D (dotted-line position in FIG. 2). When however the crank 206 is again rocked upwardly, the push member 141 is left free to resume its rest position under the action of its spring and thus the switch D resumes the rest position as shown in FIGURE 2.

The operation of the whole testing device, including the electro-mechanical parts thereof, will be described hereinafter with reference to the diagrammatic FIGURES 6 to 18 and the corresponding wiring diagrams shown in FIGURES 6a, 10a, 11a, 13a, 14a and 18a. In these figures are shown hatched: The defective package P1, which is assumed to have its top flap F unsealed; the relays A, B, E and magnet R when energized and the plunger 5 and piston 15, when locked.

Figures 6, 7:
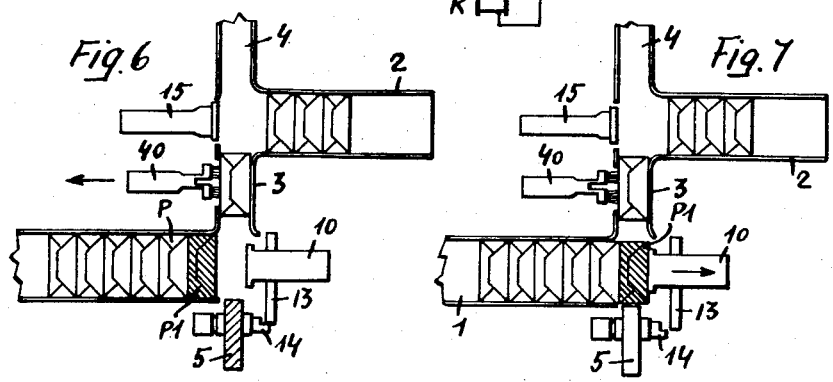

FIGURES 6 and 6a show the position of the parts when no package P is in front of plunger 5, at the "inlet station" and no defective package comes to be in channel 3 at or beyond the testing station which, as said, is the station in front of the tester 40. In this condition, all relays A, B, E and magnet R are de-energized and the plunger 5 is locked in its starting position owing to the abutment bar 13 being in the path of plunger abutment 14.

Figure 8:
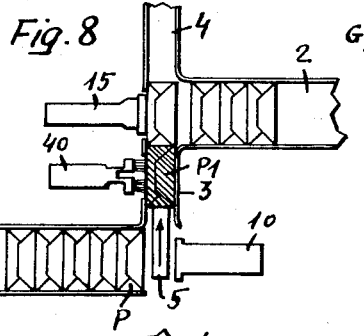
Figure 10A:
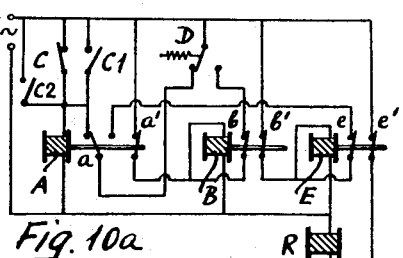
Figure 9:
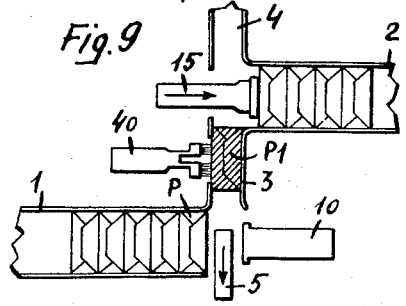
Figure 10:
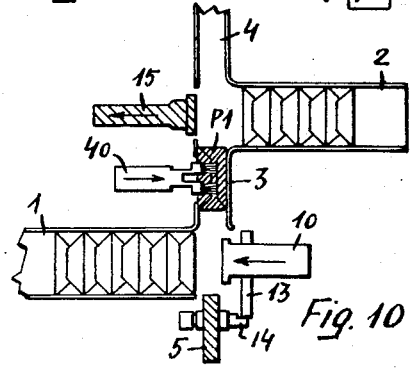

In FIGURE 7 it is seen how a package P1 (which is assumed to be a defective package) by being pushed in front of the inlet of channel 3, pushes the gate 10 and shifts bar 13 so as to unlock the plunger 5, while coming to its "inlet station." The plunger 5 is thus free, as shown in FIGURE 8, to effect its forward stroke and push said package P1 into channel 3, at the testing station. Then the plunger 5 effects its return stroke and resumes its starting position (FIG. 9), where it is again locked by abutment bar 13, as shown in FIGURE 10.

In the meantime the package P1 at the testing station, which is assumed to have its top end imperfectly sealed, is tested by the tester 40, which raises its top flap F. This raised flap through the mechanical devices which have been described, closes the contact C as shown in FIGURE 10a, thus energizing relay A. By the energizing of this relay A the switch $a$ is switched to $k1$-position thus maintaining said relay A energized even after the opening of the contact C through switch D in $d1$-position. At the same time it closes the switch $a'$ thus energizing the second relay B which thus closes the switches $b$ and $b'$. Switch $b$ serves for maintaining said relay B energized even when the switch $a'$ is opened, provided switch D is in its operating position, as will be better seen hereinafter, whereas switch $b'$ closes the energizing circuit of relay E. This relay E, by being energized, closes the switches $e$ and $e'$. Switch $e$ serves for permitting of keeping the relay E energized through switch D in $d1$ position and switch $a$ in $k1$ position and switch $e'$ serves for closing the energizing circuit of the piston-locking magnet R. Thus the simple closure of the switch C (or of the companion switch C1, in parallel therewith) promotes the closure of all relays A, B, E and of magnet R and of the locking of piston 15. This condition does not change neither upon return of the tester out of contact with the defective package P1 (FIGURES 11 and 11a), nor during the unlocking of the plunger 5 (FIG. 12) by a subsequent package P acting on bar 13 through gate 10. In fact the relay A remains energized through its shunt circuit including switch D in $d1$ position and switch $a$ in $k1$ position.

During the subsequent forward stroke of plunger 5, a fresh package P is pushed into channel 3 and when it reaches its testing station (FIG. 13) it has shifted the defective package P1 to the outlet station. At the same time, as also the relay R is energized, the switch D is shifted to the position in which it opens the energizing circuit of relay A, which thus is de-energized, and keeps the circuit of relay B closed through switch $b$, thus maintaining also the relay E and the magnet R energized. Consequently the piston 15 is maintained locked also during the testing operations of the next package P, which is assumed to be non-defective, and until it is shifted to the delivery station (FIG. 18) by a subsequent next package, while the package P, by being shifted from the testing station to the outlet station, has pushed the defective package P into the discarding channel 4.

In the meantime, during the return stroke of plunger 5 (FIGURE 17) the switch D snaps to its rest position and thus opens the energizing circuit of A through switch $a$. The other relays remain energized through their said shunt circuits.

During this forward stroke of plunger 5, the push switch D is again switched to its operating position (FIG. 18a) but, as the switch $a'$ is open, the relay B is de-energized and opens the circuit of the third relay E which is thus de-energized and opens the circuit of locking magnet R which, being de-energized, unlocks piston 15 which thus is able to push the non-defective package P into the delivery channel 2.

Thus the parts of the testing device resume their position as shown in FIGURES 6 and 6a until another defective package P1, viz. a package having either one of or both its ends unsealed, comes at the testing station.

Of course, the device according to the invention may be also employed for simply detecting imperfectly sealed packages by visibly opening their imperfectly sealed ends, without automatically separating same from the perfectly sealed packages, and leading all packages into the discarding channel 4, from which the visibly opened packages may be easily taken out by hand. This may be useful whenever the subsequent machine, which may be a cellophane-wrapping or a parcel-forming machine is out of order. For this purpose a hand-controlled switch C2 is arranged in parallel to the contacts C—C' and which, when closed, maintains the relays A, B, E and magnet R energized and the piston 15 locked.

It is also possible to construct a simplified machine in which the piston 15 and its control parts as well as the whole electric circuit are eliminated, the tester 40 serving only for visibly opening the imperfectly sealed package ends while the contacts C—C1 serve for closing a conventional alarm circuit advising that a defective package has been detected.

Of course, the invention may be employed for testing the sealed ends not only of cigarette packages, or "packets," but also of any package having tucked end flaps.

What I claim is:

1. A device for testing the sealed ends of the wrappers of packages having a sealed flap in order to detect the packages having imperfectly sealed ends, comprising means for feeding said packages, means through which said packages may move at right angles to said package-feeding means from the outlet of said feeding means and in line with a package-inlet station, reciprocating means for pushing one by one said packages as they come to be at the inlet station, to a testing station in said means through which said packages may move and then returning back leaving each package for a time at the testing station, said means through which said packages may move leaving the package ends to be tested at the testing station uncovered; means for testing the sealed ends of the wrappers, said testing means being provided with resiliently yielding pointed ends adapted to brush the uncovered ends of the packages at the testing station and to open only the imperfectly sealed package ends; means for reciprocating said testing means forth and back with its resilient ends brushing the package ends, the forward movement being effected during the time in which said package remains in the testing station and means for discharging the packages after they have been tested by said testing means.

2. A device according to claim 1, in which said reciprocating means for pushing said packages into the said testing station comprises a cam-operated plunger; means at the outlet end of said feeding means for stopping the feed during the forward stroke of the said plunger; and means for locking the said plunger in its rear position when no package is in front of it, at the inlet station.

3. A device according to claim 1, in which the resiliently yielding pointed ends of said testing means are in the form of brushes made up of bristle-like material and arranged at such an angle as to brush the ends of the package at the testing station, during the forward stroke of said testing means, against the edge of a sealed flap at each end of the package.

4. A device according to claim 1, in which said testing means, by opening the imperfectly sealed package ends, raises at least one end flap; and means is provided co-acting with the raised flap for closing electric contacts forming part of circuits for detecting imperfectly sealed packages.

5. A device according to claim 1, in which said testing means, by opening the imperfectly sealed package ends, raises at least one end flap; means is provided for co-acting with the raised flap for closing electric contacts forming part of circuits for detecting imperfectly sealed packages, delivery means is provided opening into said means through which said packages may move at right angles to said package-feeding means at the package outlet station, beyond said testing station, at the end of said last-named means; means for discarding faulty packages forming an extension of said means through which said packages may move at right angles to said package-feeding means, beyond said outlet station; reciprocating means, in front of said means through which said packages may move at right angles to said package-feeding means, for driving the perfectly sealed packages into said means through which said packages may move at right angles and means for stopping said last-named reciprocating means when and until an imperfectly sealed package comes to be at the said outlet station.

6. A device for testing the sealed ends of the wrapper of packages having a sealed flap in order to detect the packages having imperfectly sealed ends, and comprising: means for feeding said packages, means through which said packages may move at right angles to said package-feeding means from the outlet of said feeding means and in line with a package-inlet station; reciprocating means for pushing one by one said packages, as they come to the inlet station, to a testing station in said means through which said packages may move and then returning to an outward end position, leaving each package for a time at the testing station in said means through which said packages may move; means for closing the outlet end of said means for feeding said packages during the reciprocating movement of said means for pushing said packages; means for stopping said pushing means at its outward end position after each rearward stroke and until the said closing means is operating; means for unlocking said pushing means each time a package is fed to said inlet station; openings in said means through which said packages may move at said testing station leaving the package ends to be tested at said station uncovered; testing means provided with brush-like members adapted to brush against the edges of sealed flaps on the uncovered ends of said package at the said testing station and to open only the imperfectly sealed package ends; means for shifting said testing means back and forth with its said brush-like members brushing said package ends across the openings of said means through which said packages may move at right angles to said package-feeding means, the forward stroke being effected during the time in which said package remains in the testing station, and means for discharging said packages after they have been tested by said testing means.

7. A device according to claim 6, comprising further a perfectly sealed package-delivery means arranged at right angles to said means through which said packages may move at right angles to said package-feeding means at a package-outlet station past said testing station, said package delivery means having an open inlet end; reciprocating package-pushing means arranged at the outside of said delivery channel in front of its said inlet end, means for reciprocating said piston when a perfectly sealed package, after being tested by said tester, is pushed by said plunger, through a preceding package, in front of the inlet end of said package delivery means; means for discarding imperfect packages forming an extension of said means through which said packages may move at right angles to said package feeding means beyond said package-delivery means; means for locking said package pushing means when a package having at least one imperfectly sealed end is pushed towards said delivery means and means for unlocking said package pushing means when the said imperfectly sealed package has been pushed by the next package beyond said delivery means and said next package has perfectly sealed ends.

8. A device for testing the sealed ends of the wrapper of packages having a sealed flap in order to detect the packages having imperfectly sealed ends, comprising means for feeding said packages having an outlet end, shiftable means for closing said feeding means near its outlet end, means through which said packages may move at right angles to said package feeding means from the outlet of said feeding means, a package inlet station beyond the outlet end of said package feeding means and in line with the inlet of said means through which packages may move at right angles to said package feeding means; spring-urged and cam-controlled reciprocating means for pushing said packages, one-by-one, to a testing station in said means through which said packages may move at right angles to said package feeding means, upon shifting of said means for closing the outlet end of said feeding means and said packages come to the inlet station; means for locking said closing means in open position during the reciprocation of said reciprocating means and for locking said reciprocating means when said closing means is in closing position; openings in said means through which said packages may move at right angles to said package feeding means at said testing station leaving the package ends to be tested at said station uncovered; means for testing said packages provided with forwardly inclined brush-like members adapted to slip over the uncovered ends of said package at the said testing station against the edge of a sealed flap on each of such ends and to open only the imperfectly sealed or defective package; spring and cam operated means for reciprocating said testing means across the openings of said means through which said packages may move at right angles to said package feeding means and for lifting at least one flap of imperfectly sealed package ends, during the time in which said defective package remains in the testing station, and means responsive to the lifting of said flaps, for closing electric contacts.

9. A device according to claim 8, comprising further means for delivering properly sealed packages arranged at right angles at the end of said means through which said packages may move at right angles to said package feeding means and means for discarding defective packages arranged in line with, but spaced from the end of said second-named means, the space between the said testing means and discarding means being the package delivery station, and means responsive to the closure of said electric contacts for locking said delivery means outside of said delivery station until said defective package with lifted flaps has been shifted by said discarding means through intermediate packages beyond said delivery station.

10. A device according to claim 8, comprising further means for delivering properly sealed packages arranged at right angles at the end of said means through which said packages may move at right angles to said package feeding means and means for discarding defective packages arranged in line with, but spaced from the end of said second-named means, the space between said testing means and discarding means being the package delivery station, and means responsive to the closure of said electric contacts for locking said delivery means outside of said delivery station until said defective package with lifted flaps has been shifted by said discarding means through intermediate packages beyond the said delivery station; whereby said means responsive to the closure of said tester-controlled electric contacts comprise a first relay whose energizing circuit is closed directly by the closure of said tester controlled contacts, and which controls a first change-over switch co-acting with either of two contacts and a simple switch, the said first change-over switch co-acting with a first of its said two contacts when the said first relay is de-energized and with a second contact when said first relay is energized and a first simple switch, both controlled by said first relay, said first simple switch being closed when said first relay is energized and opened when said relay is de-energized; a second change-over switch maintained by return means against a first contact and adapted to be shifted by mechanical means against a second contact, said first contact of said second change-over switch forming part of a shunt circuit for energizing said first relay through said first change-over switch and over said second contact thereof; a second relay inserted in an energizing circuit which is closed through said first simple switch of said first relay, said second relay closing, when energized, a second relay-energizing shunt circuit through the said second contact of said second change-over switch and through said first second-relay controlled switch; a third relay inserted in an energizing circuit which is closed through said second switch controlled by said second relay, said third relay closing, when energized, a pair of parallel switches the first of said switches being inserted in a third relay-energizing shunt circuit including the first change-over switch co-acting with its said first contact; while the second of said switches is in an energizing circuit of an electromagnet which is energized therethrough; a magnetic member attracted by said electromagnet when energized and means attracted by said electromagnet, for stopping, when attracted, the operation of said delivery means.

11. A device according to claim 8, comprising further means for delivering properly sealed packages arranged at right angles at the end of said means through which said packages may move at right angles to said package feeding means and means for discarding defective packages arranged in line with, but spaced from the end of said second-named means, the space between said testing means and discarding means being the package delivery station, and means responsive to the closure of said electric contacts for locking said delivery means outside of said delivery station when a defective package is detected and for unlocking said discharging means as soon as said defective package with lifted flaps has been shifted by said discharging means through intermediate packages beyond the said delivery station; whereby said means responsive to the closure of said testing-means controlled electric contacts comprise a first relay whose energizing circuit is closed directly by the closure of said testing-means controlled contacts, and which controls a first change-over switch co-acting with either of two contacts and a simple switch, the said first change-over switch co-acting with a first of its said two contacts when the said first relay is de-energized and with a second contact when said first relay is energized and a first simple switch, both controlled by said first relay, said first simple switch being closed when said first relay is energized and opened when said relay is de-energized; a second change-over switch provided with an outer mechanical control means and maintained by return means against a first contact and adapted to be shifted by said mechanical means against a second contact, said first contact of said second change-over switch forming part of a shunt circuit for energizing said first relay through said first change-over switch and over said second contact thereof; a second relay inserted in an energized circuit which is closed through said first simple switch of said first relay, said second relay closing, when energized, a second relay-energizing shunt circuit through the said second contact of said second change-over switch and through said first second-relay-controlled switch; a third relay inserted in an energizing circuit which is closed through said second switch controlled by said second relay, said third relay closing, when energized, a pair of parallel switches the first of said switches being inserted in a third relay-energizing shunt circuit including the first change-over switch co-acting with its said first contact; while the second of said switches is in an energizing circuit of an electromagnet which is energized therethrough; a magnetic member attracted by said electromagnet when energized and means attracted by said electromagnet, for stopping, when attracted, the operation of said delivery means; and in which, further, said means for unlocking said delivery means when said defective package has been shifted beyond the delivery station, comprise a lever attached to said electromagnet-attracted member, a rocking member connected to one of the driving parts of said discarding means; and a balance lever having one of its arms adapted to come into contact with one of said balance lever arms, when said electromagnet is energized, so as to shift the said control means of said second change-over switch and to switch said second change-over switch so as to close a circuit through its said second contact.

12. A device for testing the sealed ends of the wrappers of packages having a sealed flap in order to detect packages having improperly sealed ends, said device comprising means through which such packages may move, said means being open to expose the sealed end of each package therein, means for testing the end seal of each package, said means having resiliently yielding pointed ends, and means for moving said testing means with its ends directed against the edge of a sealed flap on the end of each package to raise the improperly sealed flaps.

13. A device for testing the sealed ends of the wrappers of packages sealed at opposite ends with sealed flaps in order to detect the packages having improperly sealed ends, said device comprising means through which such packages may move, said last-named means being open to expose both sealed ends of each package therein, dual testing means each having resiliently yielding pointed ends, and means for mounting said testing means spaced from one another by substantially the distance between the sealed ends of a package and moving said testing means with their ends directed against the edges of sealed flaps on the ends of each package to raise the improperly sealed flaps.

References Cited in the file of this patent

UNITED STATES PATENTS

| | | |
|---|---|---|
| 2,156,822 | Smith | May 2, 1939 |
| 2,197,381 | Mansbendel | Apr. 16, 1940 |